US007281010B2

(12) United States Patent
Challener

(10) Patent No.: US 7,281,010 B2
(45) Date of Patent: Oct. 9, 2007

(54) TRUSTED COMPUTING PLATFORM WITH DUAL KEY TREES TO SUPPORT MULTIPLE PUBLIC/PRIVATE KEY SYSTEMS

(75) Inventor: David Carroll Challener, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1020 days.

(21) Appl. No.: 10/016,700

(22) Filed: Nov. 2, 2001

(65) Prior Publication Data

US 2002/0059286 A1   May 16, 2002

Related U.S. Application Data

(60) Provisional application No. 60/249,032, filed on Nov. 15, 2000.

(51) Int. Cl.
*G06F 7/00* (2006.01)
*H04L 9/00* (2006.01)

(52) U.S. Cl. ....................... 707/100; 380/277
(58) Field of Classification Search ............. 707/100; 713/168; 380/277
See application file for complete search history.

(56) References Cited

U.S. PATENT DOCUMENTS

| | | | | |
|---|---|---|---|---|
| 5,519,778 A | * | 5/1996 | Leighton et al. | 380/30 |
| 5,564,037 A | * | 10/1996 | Lam | 711/161 |
| 5,937,066 A | * | 8/1999 | Gennaro et al. | 380/286 |
| 6,192,130 B1 | * | 2/2001 | Otway | 380/277 |
| 6,307,936 B1 | * | 10/2001 | Ober et al. | 380/30 |
| 6,618,806 B1 | * | 9/2003 | Brown et al. | 713/186 |
| 6,658,568 B1 | * | 12/2003 | Ginter et al. | 713/193 |
| 6,704,868 B1 | * | 3/2004 | Challener et al. | 713/168 |
| 6,760,441 B1 | * | 7/2004 | Ellison et al. | 380/45 |

OTHER PUBLICATIONS

Microsoft Window 2000 Public key Infrastructure, Microsoft Corporation, updated Apr. 1999.*
Public key infrastructure, Streetman et al., ATI IPT Special report 00-06, Apr. 2000.*
"Trusted Computing Platform Alliance (TCPA) Trusted Platform Module Protection Profile," Version 1.9.7, Jul. 1, 2002, pp. 1-56.

* cited by examiner

*Primary Examiner*—Apu Mofiz
*Assistant Examiner*—Cindy Nguyen
(74) *Attorney, Agent, or Firm*—Winstead PC

(57) ABSTRACT

The present invention addresses the foregoing need by creating two identically structured storage trees with a single storage root key. As envisioned in the current art (e.g., the TCPA specification), all migratable keys will be stored in a migratable storage tree. These migratable keys will be storage keys except at the extreme end of any branch, where the key (known as a leaf key) will be a user key. However, an additional storage tree will also be created which shadows the migratable storage key. This second storage tree will be comprised entirely of non-migratable storage keys of the quicker loading type except for the leaf keys (which will be identical to the leaf keys in the migratable storage tree (MST). The second storage tree (SST) will have a storage key for every migratable storage key in the MST. The use authorization for the keys in the SST will be identical to the use authorization for the MST.

12 Claims, 6 Drawing Sheets

TRUSTED COMPUTING PLATFORM WITH DUAL KEY TREES TO SUPPORT MULTIPLE PUBLIC/PRIVATE KEY SYSTEMS

CROSS-REFERENCE TO RELATED APPLICATION

The present application claims priority to U.S. Provisional Patent Application Ser. No. 60/249,032 filed on Nov. 15, 2000.

TECHNICAL FIELD

The present invention relates in general to information handling systems, and in particular, to trusted computing systems.

BACKGROUND INFORMATION

Trusted computing systems have been developed under the TCPA (Trusted Computing Platform Alliance), which is hereby incorporated by reference herein. In the prior art for trusted computing, all storage keys must be 2048-bit RSA private keys. Such 2048-bit keys require a relatively large amount of time to perform. For example, it may take approximately a second to load a 2048-bit RSA key, and if there is a long chain of keys that need to be loaded, where such a key loads another key, which loads another key, which loads another key, etc. the loading of such keys can require several seconds. Such a delay can be unacceptable to many users.

It has been determined that there are other public/private key algorithms in the art, such as multi-prime keys, or elliptic curve keys, which require less time to load and perform, but which have the same security as 2048 bit RSA keys. However, the RSA specification does not allow the use of such keys for storing migratable keys. This is because migratable keys need to be readable by all Trusted Platform Modules (TPMs) specified by the TCPA.

Therefore, there is a need in the art for an ability to use the quicker loading capability of these other public/private key algorithms, while also being able to support migration of keys between TPMs. At the same time, security and usability concerns require that the security mechanisms in place to authenticate a user using a migratable key not change.

SUMMARY OF THE INVENTION

The present invention addresses the foregoing need by creating two identically structured storage trees with a single storage root key. As envisioned in the current art (e.g., the TCPA specification), all migratable keys will be stored in a migratable storage tree. These migratable keys will be storage keys except at the extreme end of any branch, where the key (known as a leaf key) will be a user key. However, an additional storage tree will also be created which shadows the migratable storage key. This second storage tree will be comprised entirely of non-migratable storage keys of the quicker loading type except for the leaf keys (which will be identical to the leaf keys in the migratable storage tree (MST)). The second storage tree (SST) will have a storage key for every migratable storage key in the MST. The use authorization for the keys in the SST will be identical to the use authorization for the MST.

When a migratable storage key creation request is made for the MST, a second non-migratable storage key request (using the faster loading keys) will also be made, so that both keys will be created. The migratable storage key request will identify its parent, and the second non-migratable storage key will identify for its parent the key in the SST which corresponds to the requested parent.

When a key loading request is made for a migratable storage key, instead of loading a migratable storage key, its corresponding key in the SST chain will be loaded. This provides the speed advantages of the alternative public/private keys without the requirement of supporting migration.

During a migration, the root migratable storage key will be the only key migrated. This allows all the keys under it to migrate automatically, without the requirement that migratable keys be loaded quickly.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
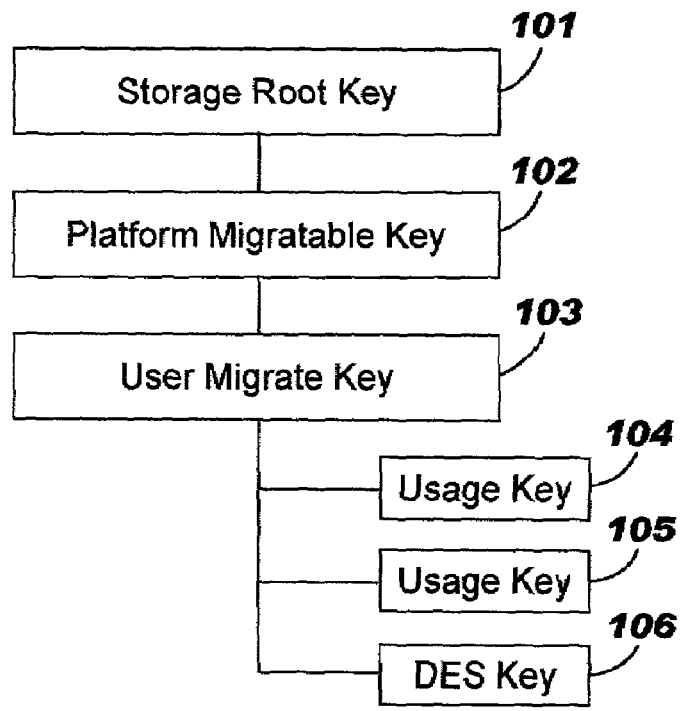
FIGS. 1-4 illustrate implementations of migratable private keys within a trusted computing platform.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention describes the use of 2048-bit RSA keys. Such keys are well known in the art. Described herein are the use of 2048-bit RSA multi-prime keys, which were designed by Compaq Corporation, where instead of using two prime numbers, such as used in 2048-bit RSA keys, there will be more than two prime numbers needed to calculate the key. It has been determined that the loading of such multi-prime keys is faster than the regular 2048-bit RSA key. As a result, it would be desirable to be able to use in a TCPA chip such multi-prime RSA keys instead of a two-prime RSA key. In addition, elliptic curve cryptography (ECC) is another type of public/private key system based on the difficulty of solving the discrete logarithm problem for elliptic curves. Such public/private key pairs are not only faster than two-prime RSA, they are also smaller, making them also desirable for usage in a TCPA chip. The problem is that the TCPA specification has designated that migratable keys must be two-prime RSA keys. As a result, the migration of 2048-bit RSA multi-prime keys, ECC keys, or any equivalent are not permitted under the TCPA specification.

Referring to FIG. 1, there is illustrated a typical design of a trusted platform module chip (TPM) for use within a trusted computing platform (TCP). The chip would have a storage root key 101, which would have a platform migratable key 102, which would also have a user key 103, which would then have signing keys 104-106. A storage root key is a private, 2048 bit RSA key created and stored in non-volatile memory in a TPM. This key is used to store other keys (referred to as children keys), as other keys can be wrapped with the public portion of the storage root key, at which point only the chip can decrypt them. A platform key 102 is a migratable private 2048 bit RSA key wrapped by the storage root key 101 and used as a root for other migratable keys. For example, user keys 103 (children of the platform key) may be wrapped with the public portion of a platform key 102. At this point, in order to decrypt a user key 103 into the chip, first the platform key 102 has to be loaded into the TPM, so the TPM knows its private key, and then the user key 103 is loaded into the TPM (which may require use of user authorization data of the platform key 102) using that private key. When upgrading hardware, it is only the migratable key that typically will need to be migrated, as all other migratable keys will exist below it. Thus, migrating this key to a new platform also effectively migrates all the keys below it. The user key 103 is a migratable private 2048 RSA key wrapped by the platform key 102 and used as a root for all of a user's migratable keys. It typically will be used to store both symmetric and private signing keys belonging to the user. When a signing key is needed, it would be required to load the user key 103, which would require the need to load the platform key 102, from the storage root key 101. The need to load all these keys will require a relatively significant amount of time when such keys are 2048-bit RSA keys.

Figure 5:
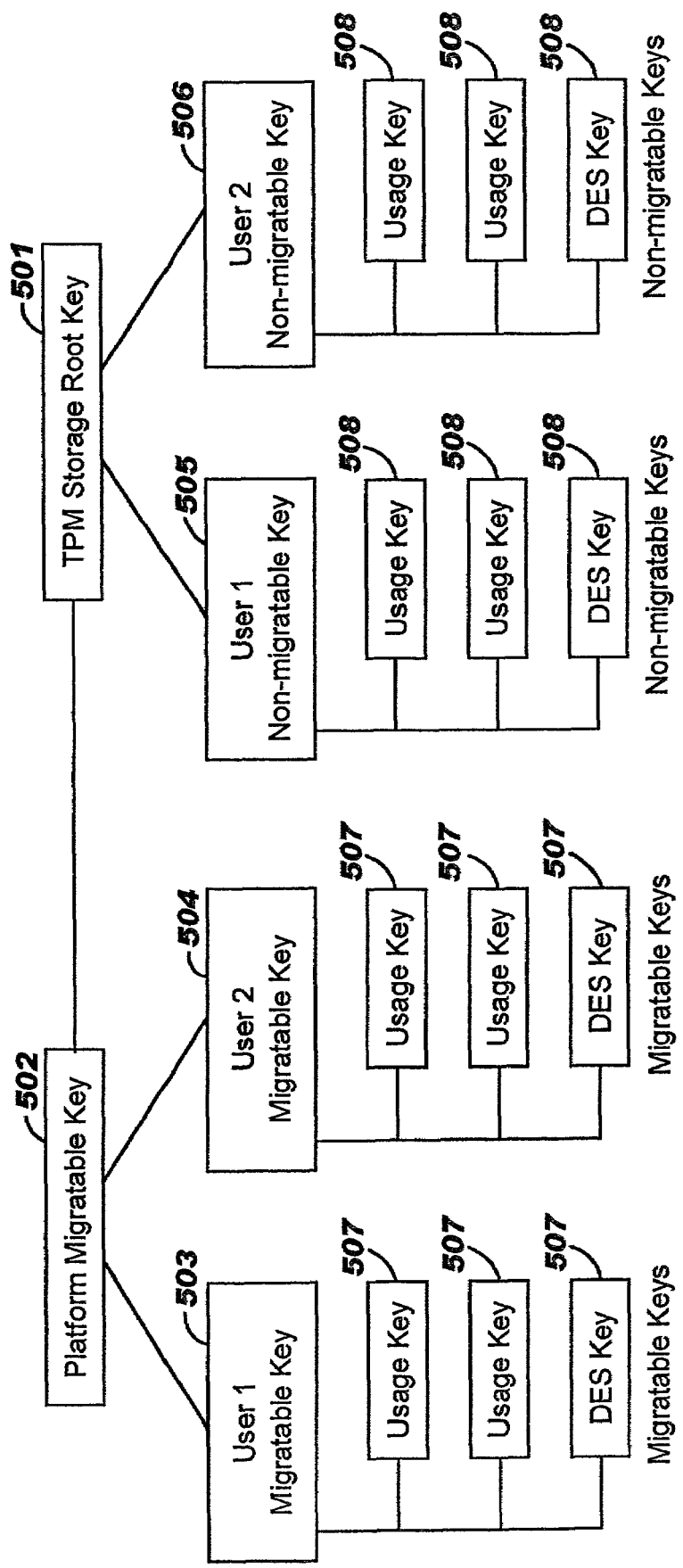
FIG. 5 illustrates the addition of multi-prime non-migratable keys within a trusted computing platform.

Referring to FIG. 5, there is illustrated an embodiment of the present invention for the creation and use of keys within a TPM, such as TPM 951 described below with respect to FIG. 9. As with FIG. 1, there is a TPM storage root key 501 and a platform migratable key 502. Additionally, there are user migratable keys 503 and 504 and signing keys 507 thereunder. All such keys are migratable. The present invention, however, makes use of the ability of a TPM to have non-migratable keys as well as migratable keys. Migratable keys can be transferred to other TPMs, and non-migratable keys cannot be transferred. Thus, such non-migratable keys are locked to the hardware, i.e., the TPM 951. With such non-migratable keys, the TPM 951 can only decrypt such keys.

Such migratable and non-migratable keys are desired within the TPM, but the use of deeply embedded migratable keys is not desired because it takes too long for such embedded key structures to load. But yet, it is desirable to have such keys migratable for maintenance purposes, such as to move a single user from one platform to another or to move an entire platform from one system to another. It is not desirable in such instances to go through the system and find every single key, to determine what kind of key it is and then migrate such keys individually.

As noted above, deeply embedded trees of keys take a relatively long time to load. For example, if it is desired to have a signing key, then that signing key will be encrypted with a public key of a user key, which may be encrypted with the key of a department, which may be encrypted with key of the platform which is encrypted with the storage root key. All such keys within the tree need to be loaded. However, since it is not desirable that every member of a department have access to the keys of every user in that department, individual user authentication data may be associated with each user key, so that only the appropriate user is allowed to load keys associated with that user. This is especially the case as a given "leaf" key may be set to not use user authentication data in order to be used, so loading the key in this case is equivalent to being able to use the key. Ease of use and security constraints dictate that there not be two sets of user authentication data for loading a key.

Figure 2:
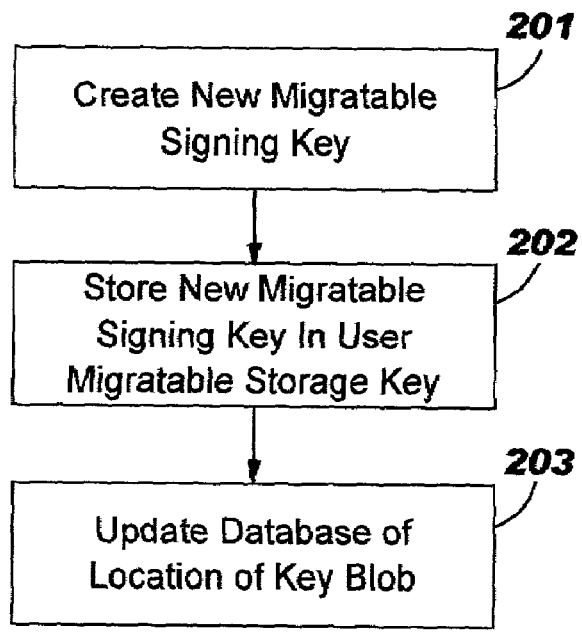

Referring to FIG. 2, there is illustrated the previous method for creating a new migratable signing key. In step 201, such a migratable signing key is created, and then in step 202, this new migratable signing key is stored in the user migratable storage key, such as storage key 503. This may require presenting to the TPM proof of knowledge of the user authentication data associated with the user migratable storage key. Then in step 203, the database within the system is updated with location of the key blob. A key blob is the migratable key wrapped by means of encryption with the storage key per the TCPA specification.

Figure 6:
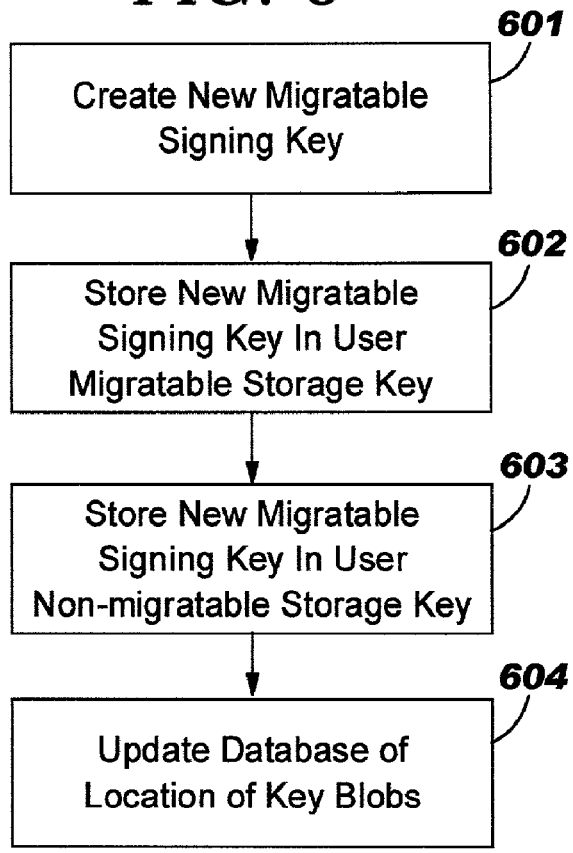
FIG. 6 illustrates storage of a non-migratable storage key in accordance with the present invention.

Referring to FIG. 6, in the present invention, in step 601, a new migratable signing key is created. Then, in step 602, the new migratable signing key is stored in the user migratable storage key 503 or 504. In step 603, the new migratable signing key is also stored in the user non-migratable storage key 505 or 506. By design, the same user authentication data is used to perform this action for both storage keys, so the user only needs to provide it once. Since the user non-migratable storage key 505 or 506 is the faster type of public/private key, it will load faster when the migratable signing key is needed.

In a similar way, when a new migratable storage key is requested to be created and stored under a specified migratable storage key M, the request will be translated into two requests. The first will behave exactly as specified by the TCPA specification. The second request will request a non-migratable storage key (of faster type) to be created and stored under the non-migratable storage key corresponding to M in the fast tree. Both requests will contain the same user authorization data, and then the database on the system which associates migratable storage keys and non-migratable storage keys will be updated to reflect the new correspondence between the two newly created keys.

Figure 3:
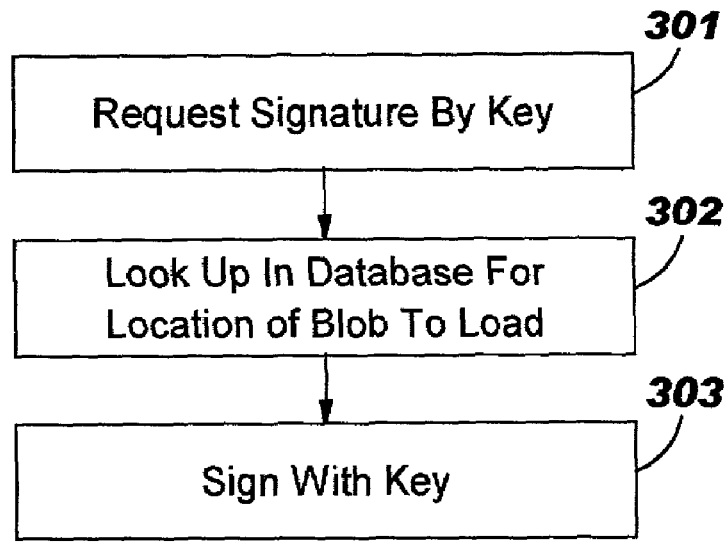

Referring to FIG. 3, there is illustrated the prior art method for requesting a signature by such a key. In step 301, an application will request a signature by a signing key. In step 302, the database within the TPM 951 will be searched for the location of a key blob to load. Keys that are used for signing are not stored in the clear, but rather made into key blobs, so only the chip can read them. However, the key blobs need to be identified, so they are associated with their public portion and identifying information so that a user can select the key desired to use when signing a document or decrypting a file. In step 303, the key will be used for the signature process. The present invention modifies this process.

Figure 7:
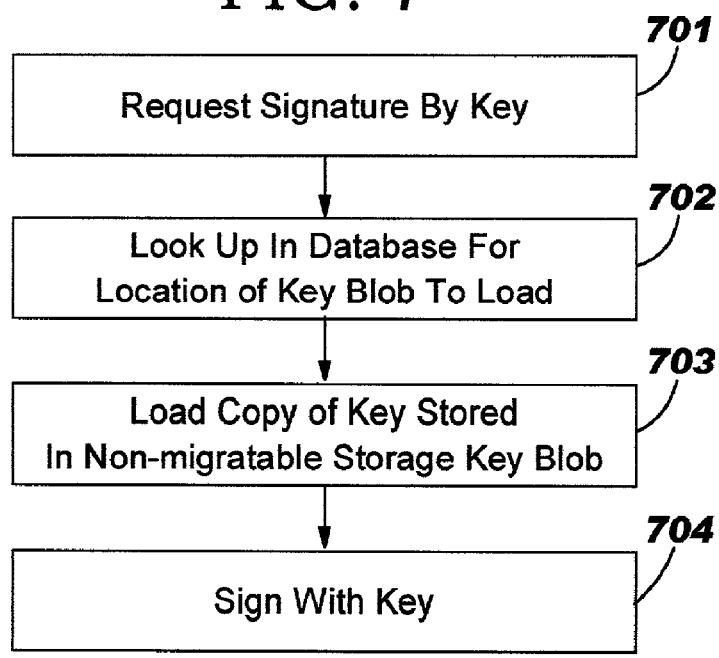
FIG. 7 illustrates a flow diagram of an operation according to one embodiment of the present invention which does not require migration.

Referring to FIG. 7, in step 701, a request for a signature by a key is made. In step 702, the database is searched for the location of the key blob to load. In step 703, a copy of the key stored in the non-migratable storage key blob is loaded, and in step 704, the key is used to execute the signature.

Figure 4:
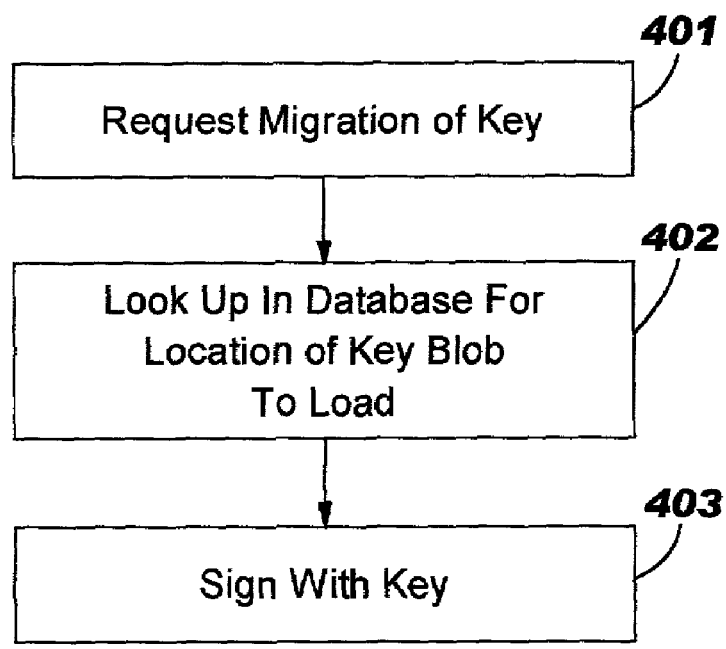

Migration of a key under the present invention is also modified. The prior art is illustrated in FIG. 4, where in step 401, migration of the key is requested, e.g., by the user of the machine who wants to upgrade to a new system or use a key on a different system. Such a migration is commenced by the user sending a migration command to the TPM. In the case of a typical TCPA chip, migrating a key from one machine to another machine involves three steps:

(1) Selecting the public key to which the key will be migrated;

(2) Loading the key, the public key to which the key will be migrated, the authorization of the key, and the authorization of the public key; and (3) Having the chip unwrap the key and re-wrap the key with the new public key. In other words, a parent key wraps a child key. In this case, a parent unwraps the key and a new parent is allowed to "have custody" of the child by re-wrapping it with the new parent key.

In step 402, the database within the TPM is searched for the location of the key blob to load. In step 403, the key is used to sign. The keys migrated are of two types: storage keys used to store other keys, and signing keys used to create a digital signature.

Figure 8:
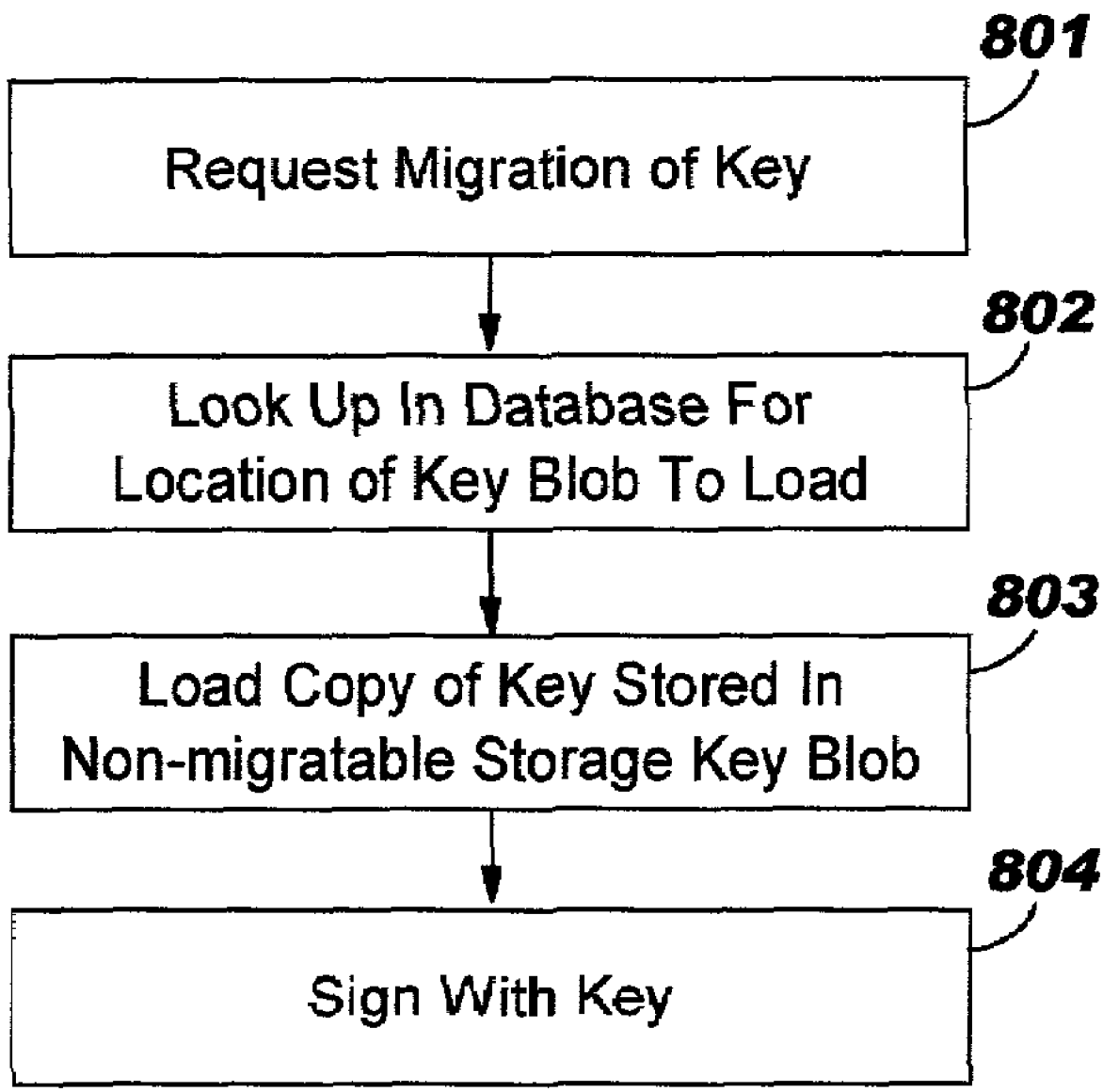
FIG. 8 illustrates an operation in accordance with the present invention which does require migration.

In the new case, the same would happen, but since a migratable key can be either wrapped by a migratable key or a non-migratable key, it can be loaded in two different ways—either from the migratable stack or from the non-migratable stack. In the case of a migratable key that is being migrated, it will be faster to load it from the fast stack than the slow stack (assuming it has been wrapped both ways). In the present invention, in FIG. 8, in step 801, a migration of a key is requested. In step 802, the database is searched for the location of the key blob to load. In step 803, a copy of the key stored in the non-migratable storage key blob is loaded, and this key is used to sign in step 804.

The present invention allows users to store and load keys much more quickly with faster public/private keys than 2048 bit RSA keys. However, the present invention preserves both the ability to migrate keys and also the structure of user authentication data needed to load or use a key.

Such keys can be used for a digital signature, such as when sending an e-mail. A key may also be loaded to use to decrypt a file such as through the use of the DES keys 507, 508.

Figure 9:
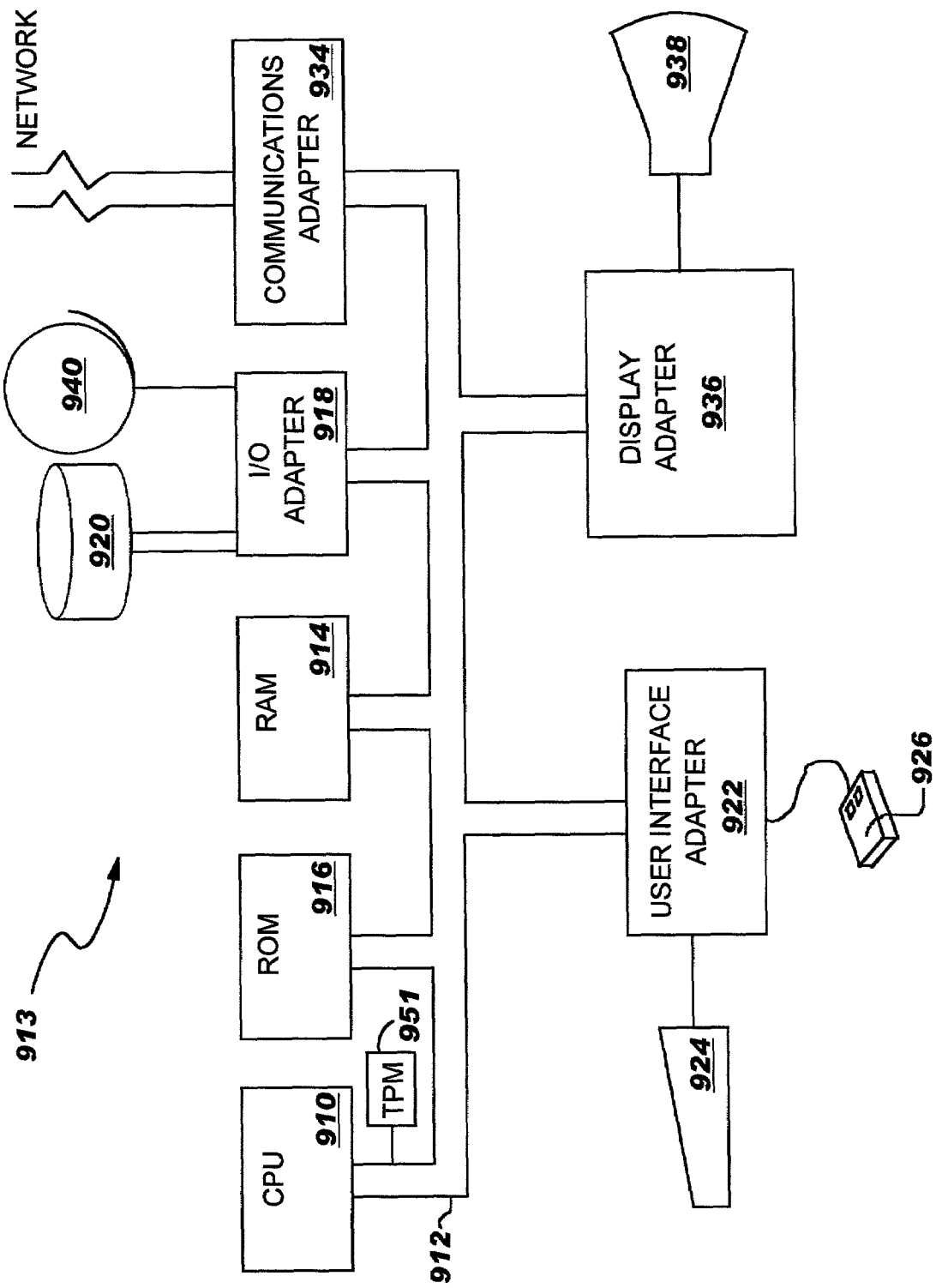
FIG. 9 illustrates a data processing system configured in accordance with the present invention.

Referring first to FIG. 9, an example is shown of a data processing system 900 which may be used for the invention. The system has a central processing unit (CPU) 910, which is coupled to various other components by system bus 912. Read only memory ("ROM") 916 is coupled to the system bus 912 and includes a basic input/output system ("BIOS") that controls certain basic functions of the data processing system 900. TPM 951, random access memory ("RAM") 914, I/O adapter 918, and communications adapter 934 are also coupled to the system bus 912. I/O adapter 918 may be a small computer system interface ("SCSI") adapter that communicates with a disk storage device 920. Communications adapter 934 interconnects bus 912 with an outside network enabling the data processing system to communicate with other such systems. Input/Output devices are also connected to system bus 912 via user interface adapter 922 and display adapter 936. Keyboard 924, track ball 932, mouse 926 and speaker 928 are all interconnected to bus 912 via user interface adapter 922. Display monitor 938 is connected to system bus 912 by display adapter 936. In this manner, a user is capable of inputting to the system throughout the keyboard 924, trackball 932 or mouse 926 and receiving output from the system via speaker 928 and display 938.

Implementations of the invention include implementations as a computer system programmed to execute the method or methods described herein, and as a computer program product. According to the computer system implementation, sets of instructions for executing the method or methods may be resident in the random access memory 914 of one or more computer systems configured generally as described above. Until required by the computer system, the set of instructions may be stored as a computer program product in another computer memory, for example, in disk drive 920 (which may include a removable memory such as an optical disk or floppy disk for eventual use in the disk drive 920 or within TPM 951). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. In a data processing system, a method comprising the steps of:

creating a migratable storage tree with a storage root key;

creating a non migratable storage tree with the storage root key, wherein the migratable storage tree and the non migratable storage tree are identically structured;

requesting a migratable storage key; and requesting a non migratable storage key;

wherein the step of requesting a migratable storage key will identify a parent key in the migratable storage tree, and wherein the step of requesting a non migratable storage key will identify a parent key in the non migratable storage tree that corresponds to the parent key in the migratable storage tree.

2. In a data processing system, a method comprising the steps of:

splitting a request to create a new migratable storage key with given authentication data and a first parent key into first and second commands;

wherein the first command creates a migratable storage key with the given authentication data and the first parent key; and wherein the second command requests creating a non-migratable storage key with the given authentication data and a second parent key which is determined from looking up a key that corresponds to the first parent key in a database.

3. The method recited in claim 2, wherein the migratable storage key and the non migratable storage key are associated in a database.

4. The method recited in claim 2, wherein the non-migratable key is a multi-prime key.

5. The method recited in claim 2, where the non-migratable key is an elliptic curve key.

6. The method as recited in claim 2, further comprising the steps of:

creating a new migratable signing key with the given authentication data and a third parent key;

storing the new migratable signing key with the given authentication data and the third parent key;

storing the new migratable signing key with the given authentication data and a fourth parent key where the fourth parent key is a non-migratable key associated with the third parent key in a database.

7. The method as recited in claim 6, further comprising the steps of:

requesting a signature by the new migratable signing key;

searching the database for the location of a key blob containing the new migratable signing key;

loading a copy of the new migratable signing key stored in the key blob created with the non-migratable parent key; and signing with the new migratable signing key.

8. The method as recited in claim 2, further comprising the steps of:

creating a new data stored by means of the first parent key;

storing the new data with the first parent key;

storing the new data with the second parent key where the second parent key is a non-migratable key associated with the third parent key in a database.

9. The method as recited in claim 8, further comprising the steps of:

requesting data stored by the new migratable storage key;

searching the database for the location of a key blob associated with the new migratable storage key;

loading a copy of the key blob created with the non-migratable storage key; and decrypting the data.

10. The method as recited in claim 7, further comprising the steps of:

requesting migration of new migratable signing keys;

searching the database for the location of a key blob associated with a non-migratable parent of the key to be migrated;

processing the migration.

11. In a data processing system, a method comprising the steps of:

creating a migratable storage tree with a storage root key; and creating a non-migratable storage tree with the storage rootkey where the migratable storage tree and the non-migratable storage tree are identically structured with corresponding keys and authentication data;

wherein the non-migratable storage tree will include non-migratable storage keys corresponding to a subset of the migratable storage keys in the migratable storage tree.

12. In a data processing system, a method comprising the steps of:

creating a migratable storage tree with a storage root key; and creating a non-migratable storage tree with the storage rootkey where the migratable storage tree and the non-migratable storage tree are identically structured with corresponding keys and authentication data;

wherein use authorization in the non-migratable storage tree can be deduced from user authorization in the migratable storage tree with additional data;

wherein the use authorization in the non-migratable storage tree is obtained by hashing the concatenation of the user authorization in the migratable storage tree with a fixed string.

* * * * *